(12) United States Patent
Wachter (10) Patent No.: US 7,798,166 B1
(45) Date of Patent: Sep. 21, 2010

(54) LAWN FERTILIZING SYSTEM

(76) Inventor: Donald R. Wachter, 29606 Parkglen Pl., Canyon Country, CA (US) 91387

( * ) Notice: Subject to any disclaimer, the term of this patent is extended or adjusted under 35 U.S.C. 154(b) by 335 days.

(21) Appl. No.: 12/017,649

(22) Filed: Jan. 22, 2008

(51) Int. Cl.
*E03B 11/00* (2006.01)

(52) U.S. Cl. .................. 137/268; 422/264; 239/310

(58) Field of Classification Search ............... 137/268; 422/264; 239/310; 210/169
See application file for complete search history.

(56) References Cited

U.S. PATENT DOCUMENTS

| | | | |
|---|---|---|---|
| 3,807,434 A * | 4/1974 | Rasmussen et al. | 137/268 |
| 3,833,177 A | 9/1974 | Pasley et al. | |
| 4,059,522 A * | 11/1977 | Polley et al. | 210/198.1 |
| 4,340,078 A | 7/1982 | Pasley et al. | |
| 5,699,827 A | 12/1997 | Delorme et al. | |
| 5,775,593 A | 7/1998 | Delorme et al. | |
| 6,173,732 B1 | 1/2001 | Davis et al. | |
| 2002/0027172 A1 | 3/2002 | Whiteley | |

* cited by examiner

*Primary Examiner*—Kevin L Lee (57) ABSTRACT

A lawn fertilizing system includes a connecting pipe that has a primary inlet and a primary outlet and a perimeter wall extending therebetween. The perimeter wall has a secondary outlet therein and a secondary inlet therein. A portion of liquid flowing through the connecting pipe bypasses the secondary outlet and flows directly from the primary inlet to the primary outlet. Another portion of liquid flowing through the connecting pipe flows outwardly of the connecting pipe through the secondary outlet. A housing has a peripheral wall enclosing an inner space. An outlet tube fluidly couples the inner space to the secondary inlet and an inlet tube fluidly couples the inner space to the secondary outlet. Fertilizer placed in the housing is mixed with water from the secondary outlet and flows outwardly of the housing through the outlet tube and into the connecting pipe through the secondary inlet.

13 Claims, 9 Drawing Sheets

LAWN FERTILIZING SYSTEM

BACKGROUND OF THE INVENTION

Field of the Invention

The present invention relates to fertilizing devices and more particularly pertains to a new fertilizing device for allowing a person to add fertilizer directly to the water flowing through a sprinkler system.

SUMMARY OF THE INVENTION

The present invention meets the needs presented above by generally comprising a connecting pipe that has a primary inlet and a primary outlet. A perimeter wall extends between the primary inlet and the primary outlet. The perimeter wall has a secondary outlet therein and a secondary inlet therein. A portion of liquid flowing through the connecting pipe bypasses the secondary outlet and flows directly from the primary inlet to the primary outlet. Another portion of liquid flowing through the connecting pipe flows outwardly of the connecting pipe through the secondary outlet. A housing has a peripheral wall enclosing an inner space. An outlet tube fluidly couples the inner space to the secondary inlet and an inlet tube fluidly couples the inner space to the secondary outlet. Fertilizer placed in the housing is mixed with water from the secondary outlet and flows outwardly of the housing through the outlet tube and into the connecting pipe through the secondary inlet.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 10 thereof, a new fertilizing device embodying the principles and concepts of the present invention and generally designated by the reference numeral 10 will be described.

As best illustrated in FIGS. 1 through 10, the lawn fertilizing system 10 generally comprises a connecting pipe 12 that has a primary inlet 14 and a primary outlet 16. A perimeter wall 18 extends between the primary inlet 14 and the primary outlet 16. The perimeter wall 18 has a secondary outlet 20 therein and a secondary inlet 22 therein. A portion of liquid flowing through the connecting pipe 12 bypasses the secondary outlet 20 and flows directly from the primary inlet 14 to the primary outlet 16. Another portion of liquid flowing through the connecting pipe 12 flows outwardly of the connecting pipe 12 through the secondary outlet 20. A water source 22 is fluidly coupled to the primary inlet 14 and a conventional sprinkler system 24, which may include additional valves and sprinkler heads, is fluidly coupled to the primary outlet 16.

A housing 26 has a peripheral wall 28 that has an access aperture 30 therein to access an inner space 32 of the housing 26. An outlet tube 34 fluidly couples the inner space 32 to the secondary inlet 22. An inlet tube 36 fluidly couples the inner space 32 to the secondary outlet 20. Fertilizer placed in the housing 26 is mixed with water from the secondary outlet 20 and flows outwardly of the housing 26 through the outlet tube 34 and into the connecting pipe 12 through the secondary inlet 22. A cover 38 is removably coupled to the housing 26 to close the access, aperture 30. The cover 38 is threadably coupled to the peripheral wall 28.

The peripheral wall 28 of the housing 26 includes a bottom wall 40. The access aperture 30 is positioned distal to the bottom wall 40. The outlet tube 34 extends through the bottom wall 40 and toward the access aperture 30. Fertilizer placed in the housing 26 is positioned laterally between the outlet tube 34 and the peripheral wall 28. The peripheral wall 28 includes transparent portions to allow viewing into the housing 26.

The inlet tube 36 has a first end 42 positioned within the connecting pipe 12 and a second end 44 fluidly coupled to the housing 26. The first end 42 is directed toward the primary inlet 14. The first end 42 is positioned nearer to the primary inlet 14 than the secondary inlet 22 to prevent liquid from the secondary inlet 22 from entering the first end 42 of the inlet tube 36. The second end 44 is positioned below an upper end 46 of the outlet tube 34.

A one way valve 48 is mounted in the outlet tube 34 and allows flow of liquid in only a first direction from the housing 26 to the connecting pipe 12 through the outlet tube 34. This will prevent water from flowing into the housing 26 through the outlet tube 34. A drain valve 50 is mounted on the housing 26 and is fluidly coupled to the interior space 32. The drain valve 50 is opened to drain liquid from the interior space 32 or closed to retain liquid in the interior space 32. This may be done before additional fertilizer is added to the housing 26. A shut off valve 52 is fluidly coupled to the inlet tube 36 to open or close the inlet tube 36.

Figure 1:
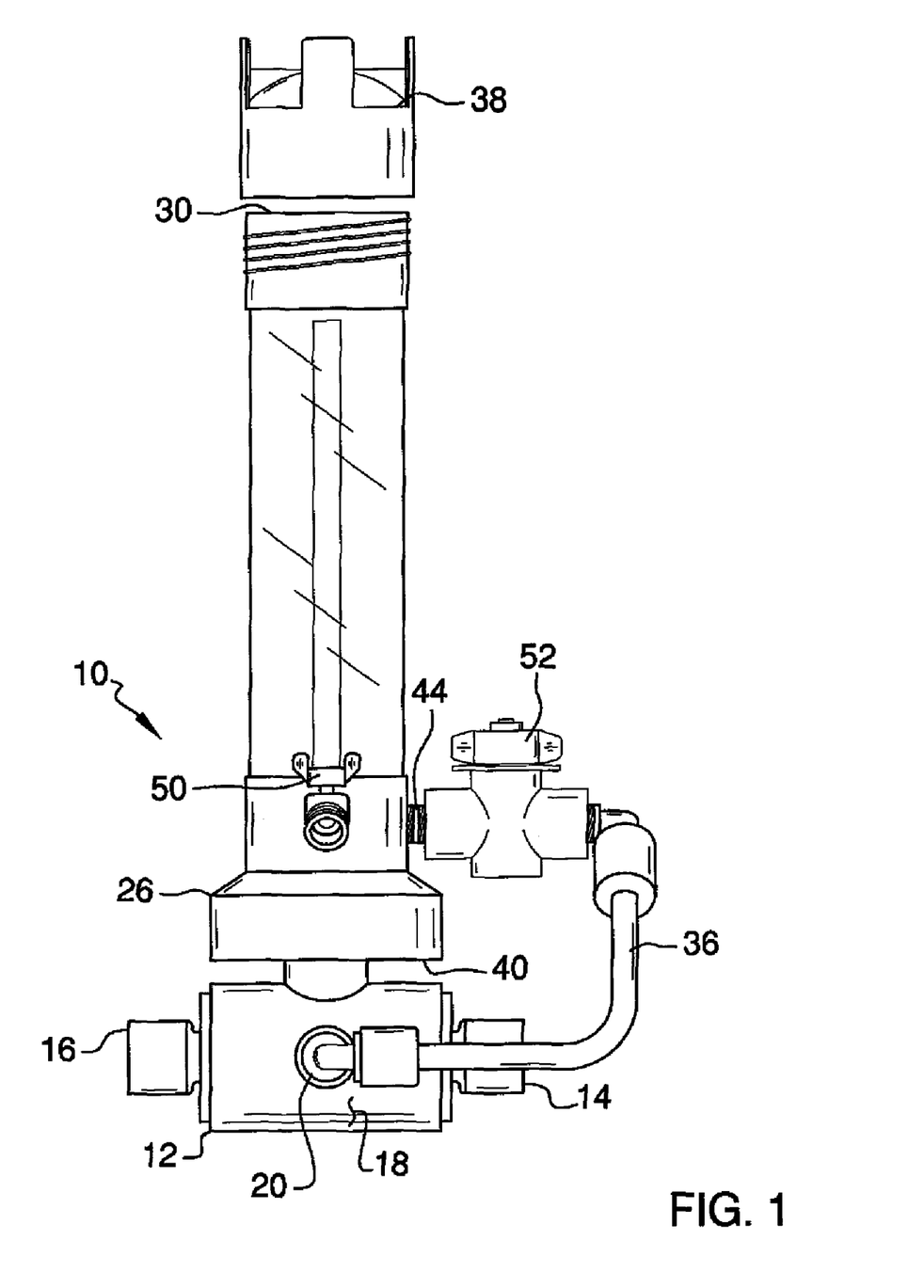
FIG. 1 is a front expanded view of a lawn fertilizing system according to the present invention.
Figure 2:
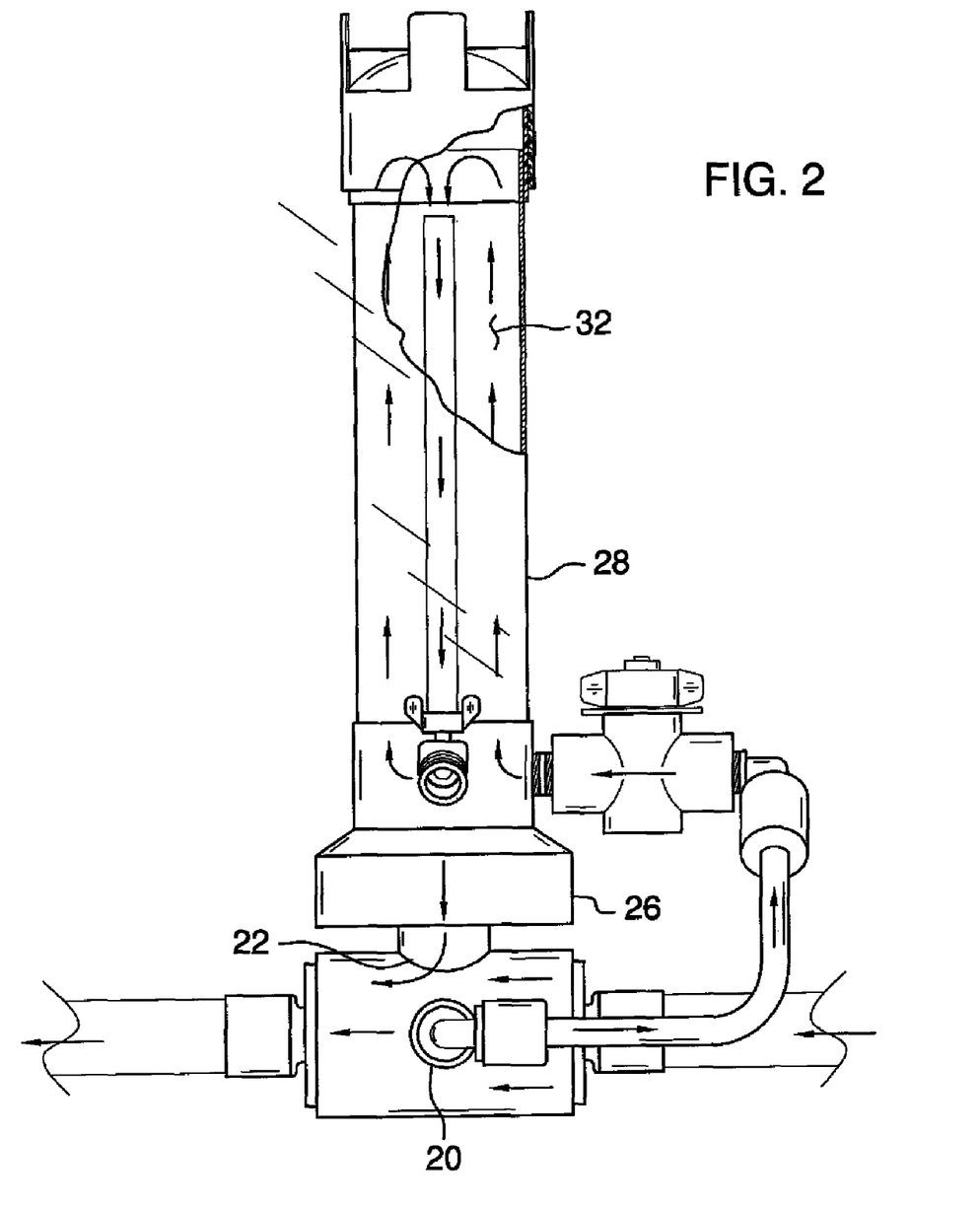
FIG. 2 is a front view of the present invention.
Figure 3:
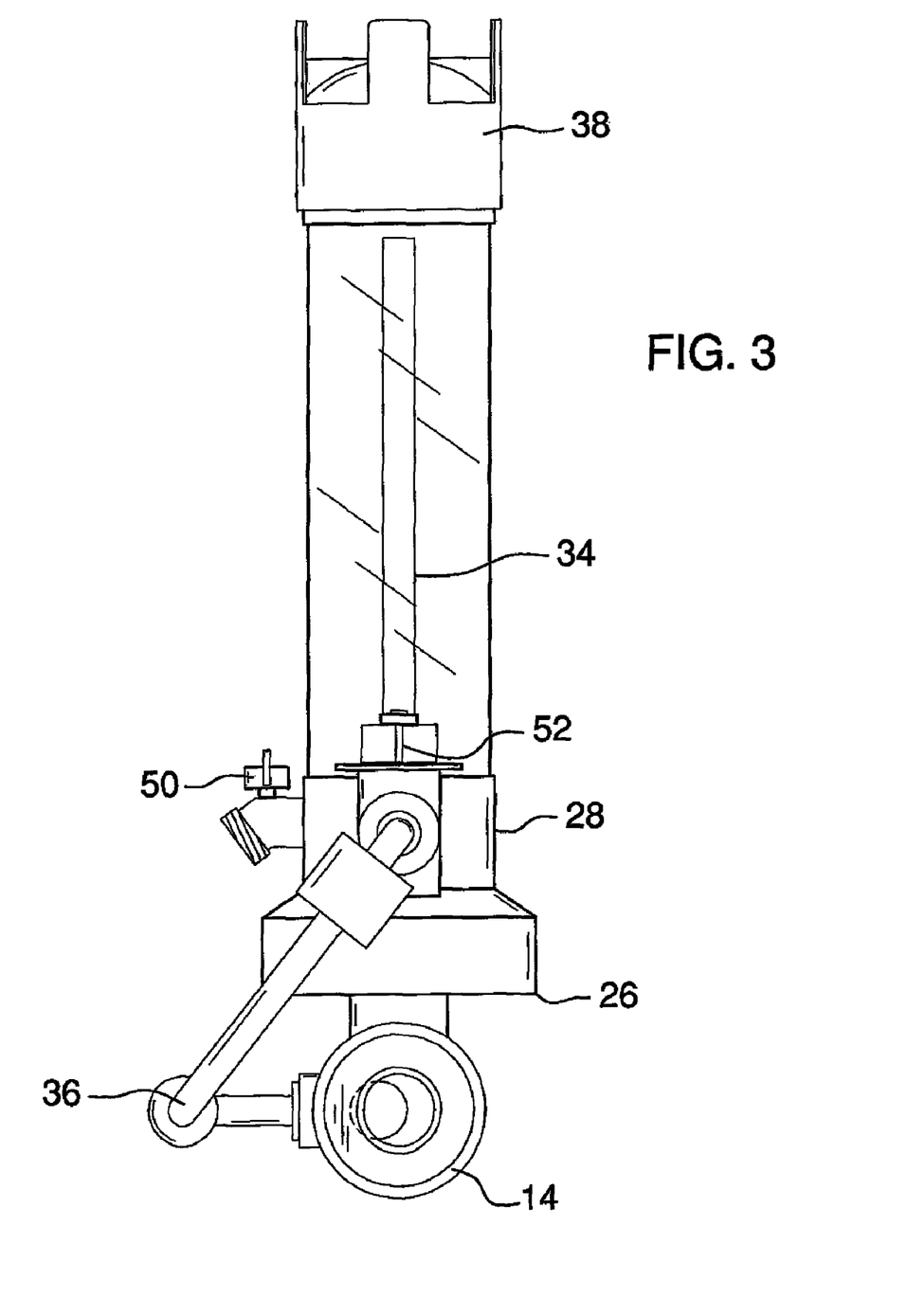
FIG. 3 is a left side view of the present invention.
Figure 4:
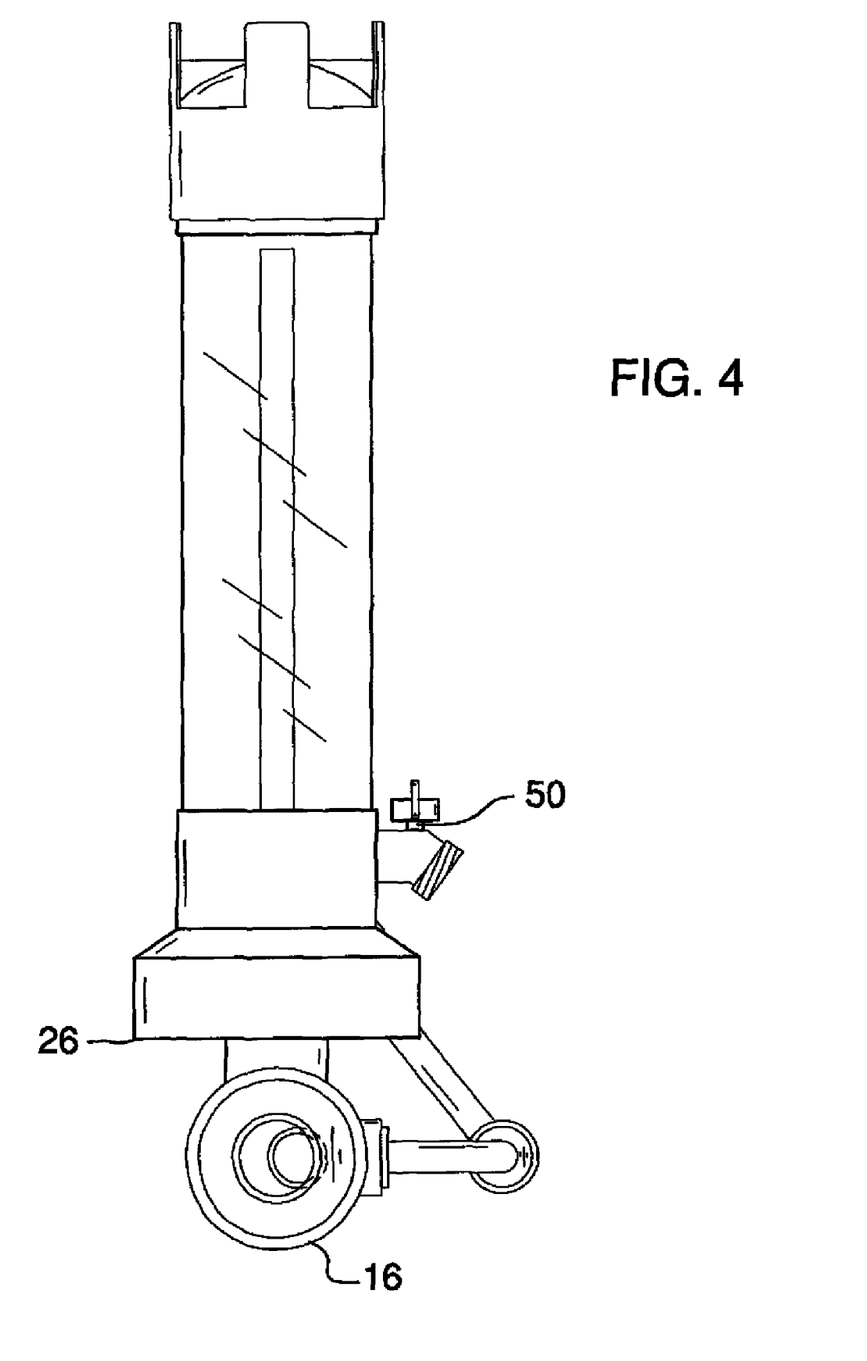
FIG. 4 is a right side view of the present invention.
Figure 5:
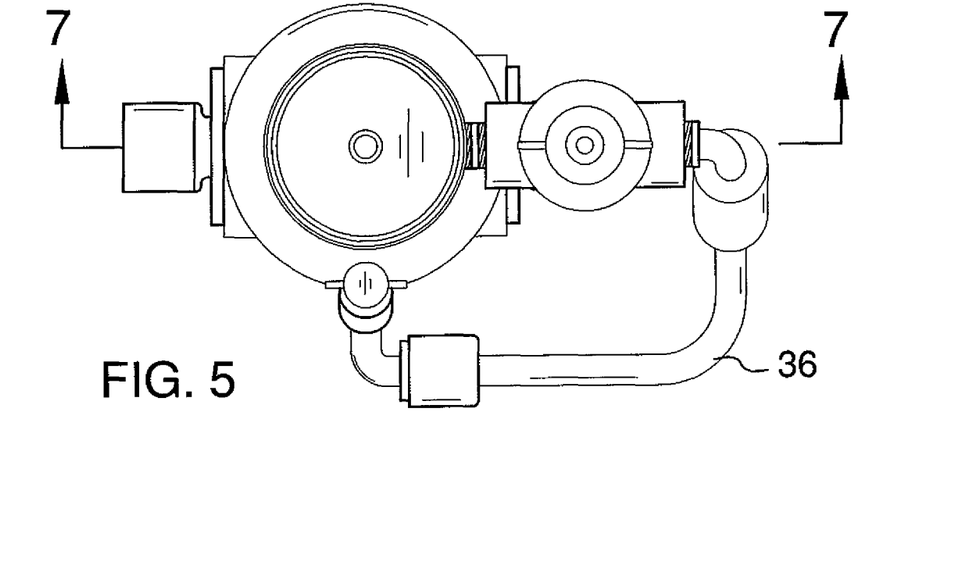
FIG. 5 is a top view of the present invention.
Figure 6:
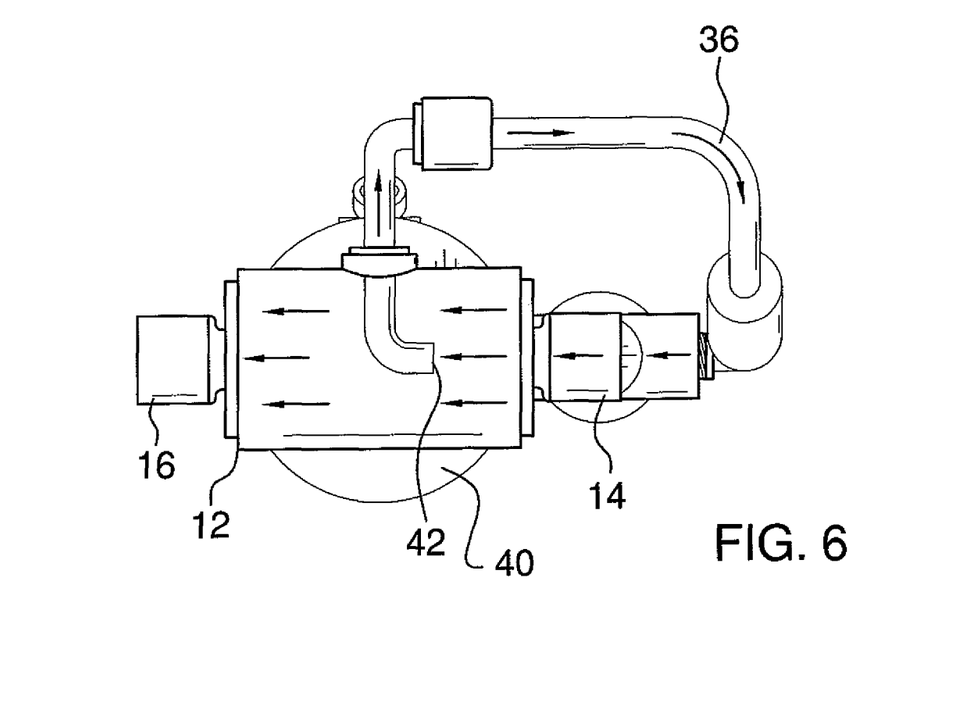
FIG. 6 is a bottom view of the present invention.
Figure 7:
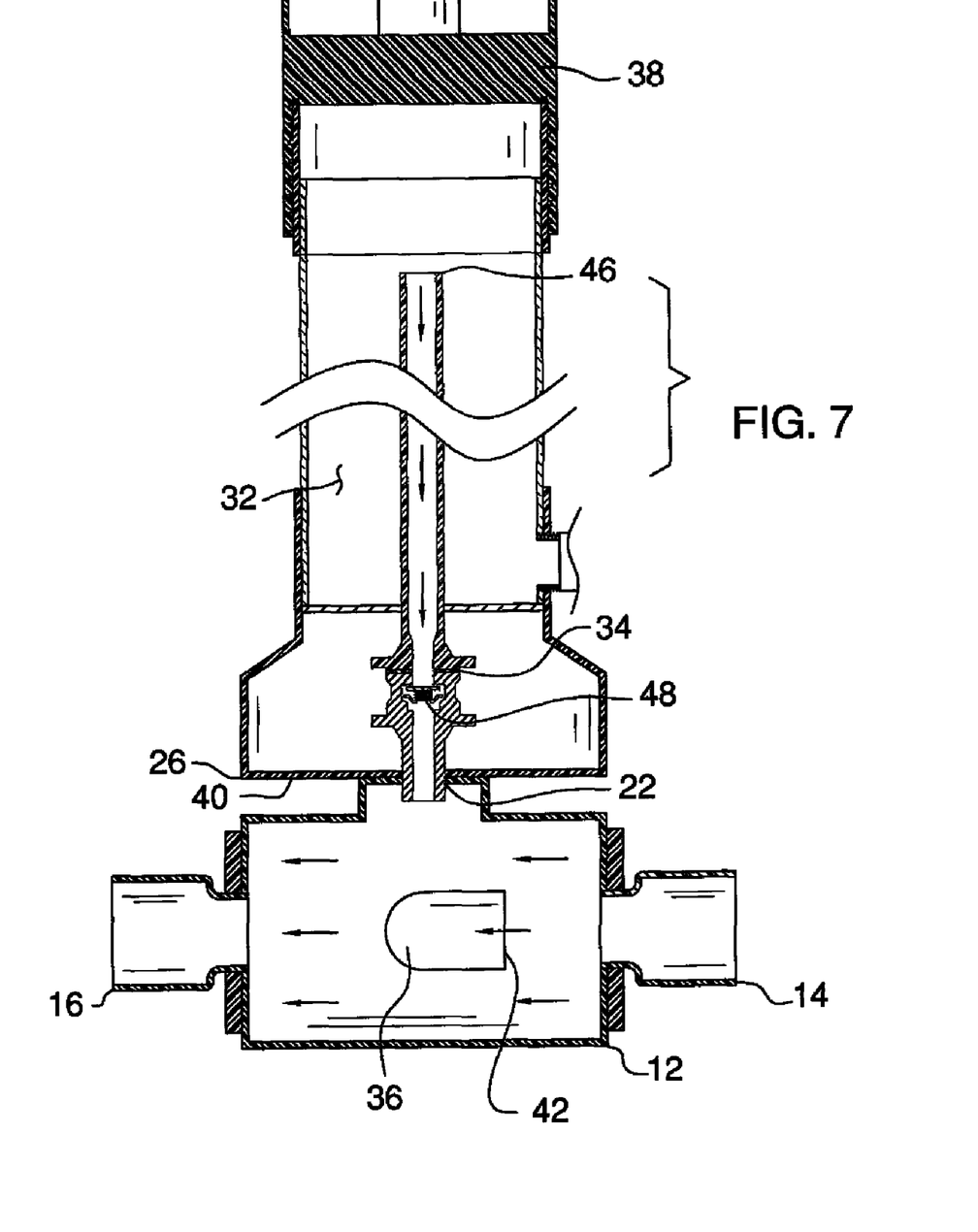
FIG. 7 is a cross-sectional view taken along line 7-7 of FIG. 5 of the present invention.
Figure 8:
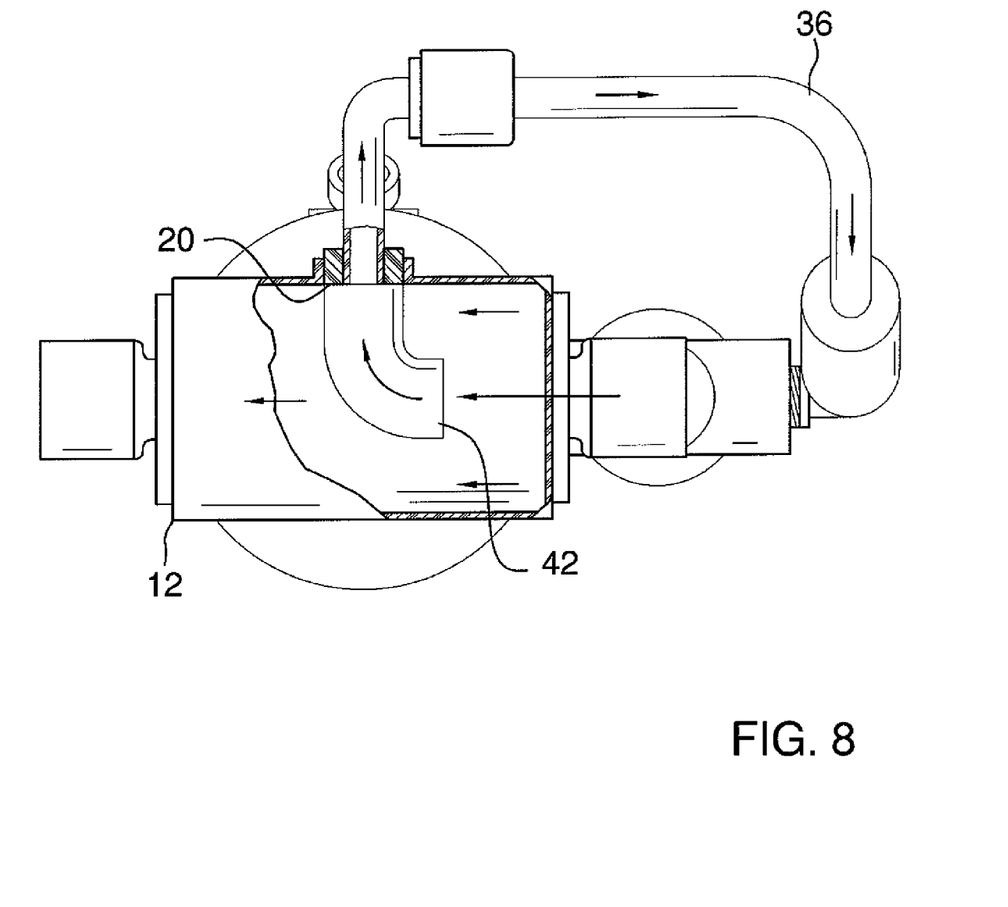
FIG. 8 is a bottom broken view of the present invention.
Figure 9:
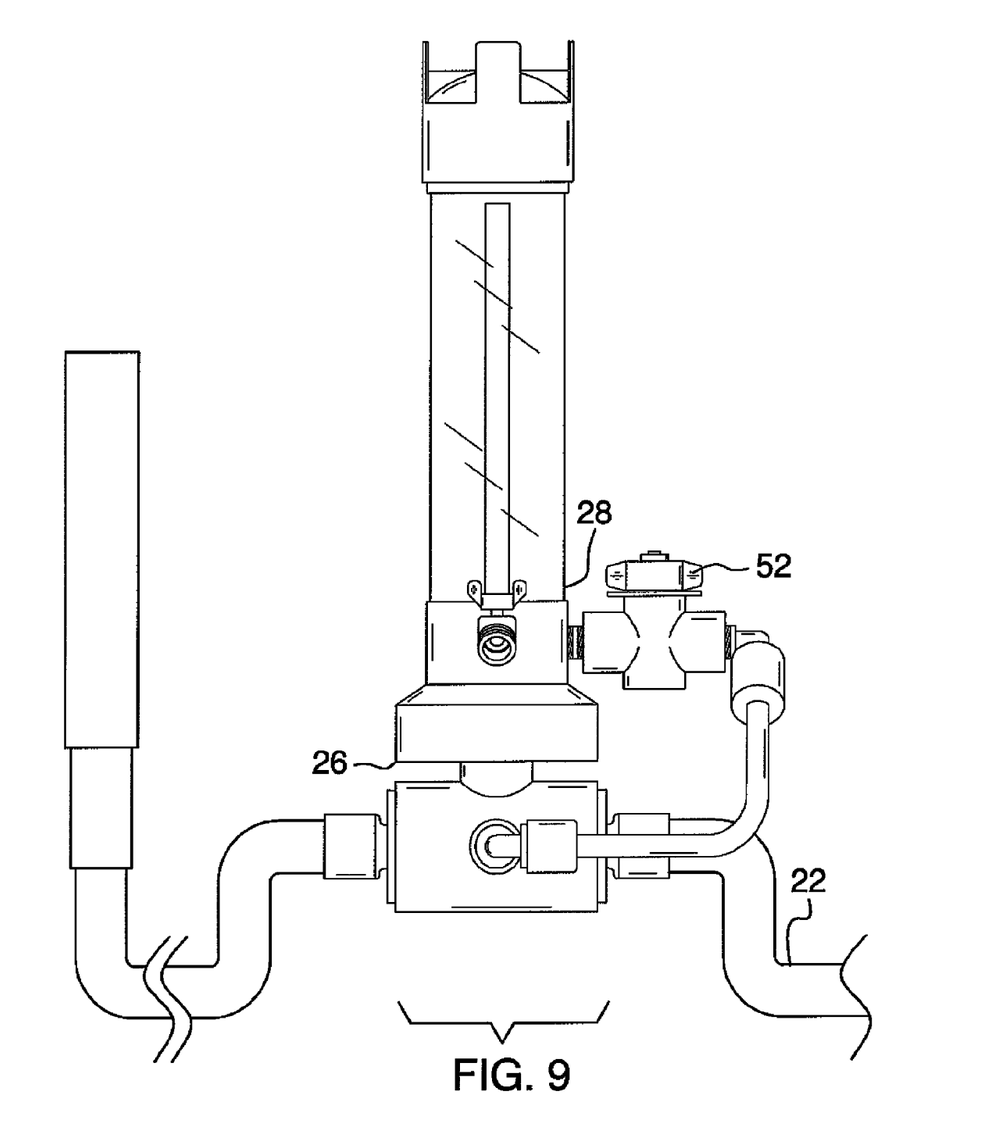
FIG. 9 is a front in-use view of the present invention.
Figure 10:
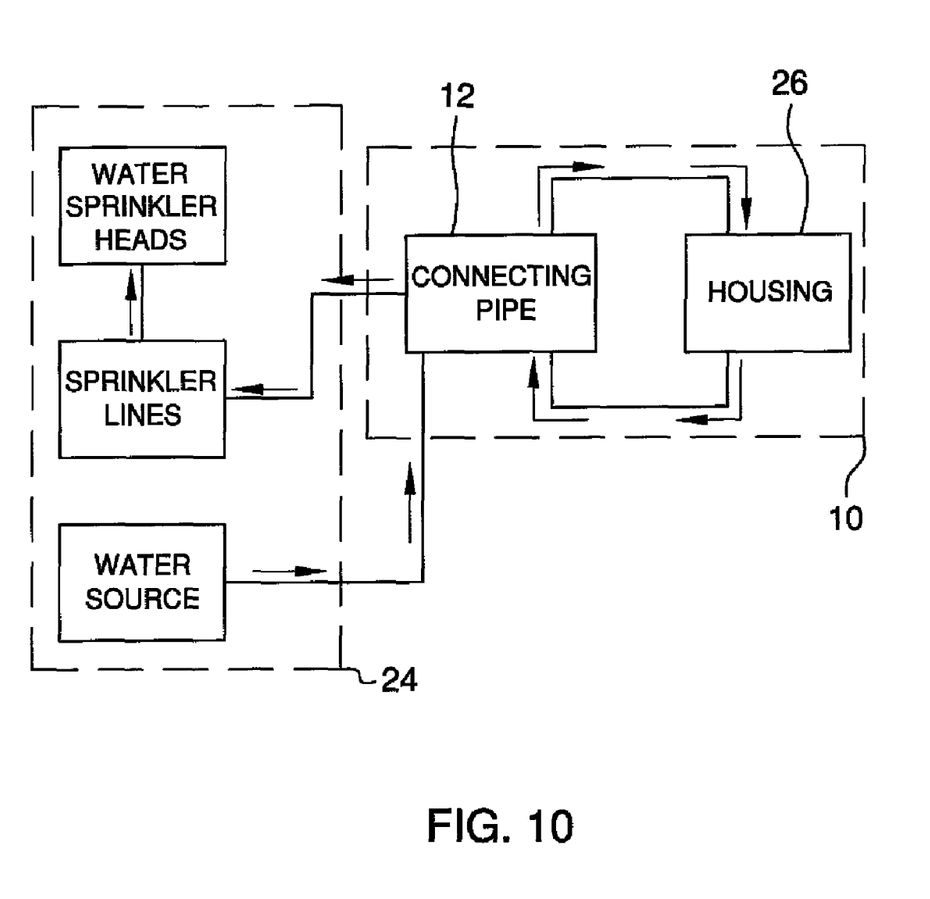
FIG. 10 is a schematic view of the present invention.

In use, the connecting pipe 12 is fluidly coupled to a conventional sprinkler system 24 and fertilizer is added to the housing 26 as needed. When the sprinkler system 24 is turned on, water flowing through the sprinkler system 24 will flow through the fertilizing system 10 and add fertilizer to the water before it is sprayed onto a lawn or plants.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fertilizing and watering combination system comprising:
    a connecting pipe having a primary inlet and a primary outlet, a perimeter wall extending between said primary inlet and said primary outlet, said perimeter wall having a secondary outlet therein and a secondary inlet therein, wherein a portion of liquid flowing through said connecting pipe bypasses said secondary outlet and flows directly from said primary inlet to said primary outlet, wherein another portion of liquid flowing through said connecting pipe flows outwardly of said connecting pipe through said secondary outlet;
    a housing having a peripheral wall enclosing an interior space;
    an outlet tube fluidly coupling said inner space to said secondary inlet, an inlet tube fluidly coupling said inner space to said secondary outlet, wherein fertilizer placed in said housing is mixed with water from said secondary outlet and flows outwardly of said housing through said outlet tube and into said connecting pipe through said secondary inlet;
    said peripheral wall having an access aperture therein to access an inner space of said housing, a cover being removably coupled to said housing to close said access aperture, said cover being threadably coupled to said peripheral wall; and
    said peripheral wall of said housing includes a bottom wall, said access aperture being positioned distal to said bottom wall.

2. The system according to claim 1, wherein said outlet tube extends through said bottom wall and extending toward said access aperture, wherein fertilizer placed in said housing is positioned laterally between said outlet tube and said peripheral wall.

3. The system according to claim 2, wherein said inlet tube has a first end positioned within said connecting pipe and a second end fluidly coupled to said housing, said first end being directed toward said primary inlet, said first end being positioned nearer to said primary inlet than said secondary inlet to prevent liquid from said secondary inlet from entering said first end of said inlet tube.

4. The system according to claim 3, wherein said second end is positioned below an upper end of said outlet tube.

5. The system according to claim 1, wherein said inlet tube has a first end positioned within said connecting pipe and a second end fluidly coupled to said housing, said first end being directed toward said primary inlet, said first end being positioned nearer to said primary inlet than said secondary inlet to prevent liquid from said secondary inlet from entering said first end of said inlet tube.

6. The system according to claim 2, wherein said inlet tube has a first end positioned within said connecting pipe and a second end fluidly coupled to said housing, said second end being positioned below an upper end of said outlet tube.

7. The system according to claim 1, wherein said peripheral wall includes transparent portions to allow viewing into said housing.

8. The system according to claim 1, further including a one way valve being mounted in said outlet tube and allowing flow of liquid in only a first direction from said housing to said connecting pipe through said outlet tube.

9. The system according to claim 1, further including a drain valve being mounted on said housing and fluidly coupled to said interior space, said drain valve being opened to drain liquid from said interior space or closed to retain liquid in said interior space.

10. The system according to claim 1, further including a shut off valve being fluidly coupled to said inlet tube to open or close said inlet tube.

11. The system according to claim 6, further including a one way valve being mounted in said outlet tube and allowing flow of liquid in only a first direction from said housing to said connecting pipe through said outlet tube.

12. The system according to claim 11, further including a shut off valve being fluidly coupled to said inlet tube to open or close said inlet tube.

13. A fertilizing and watering combination system comprising:
    a connecting pipe having a primary inlet and a primary outlet, a perimeter wall extending between said primary inlet and said primary outlet, said perimeter wall having a secondary outlet therein and a secondary inlet therein, wherein a portion of liquid flowing through said connecting pipe bypasses said secondary outlet and flows directly from said primary inlet to said primary outlet, wherein another portion of liquid flowing through said connecting pipe flows outwardly of said connecting pipe through said secondary outlet;
    a housing having a peripheral wall having an access aperture therein to access an inner space of said housing, an outlet tube fluidly coupling said inner space to said secondary inlet, an inlet tube fluidly coupling said inner space to said secondary outlet, wherein fertilizer placed in said housing is mixed with water from said secondary outlet and flows outwardly of said housing through said outlet tube and into said connecting pipe through said secondary inlet;
    a cover being removably coupled to said housing to close said access aperture, said cover being threadably coupled to said peripheral wall;
    said peripheral wall of said housing includes a bottom wall, said access aperture being positioned distal to said bottom wall, said outlet tube extending through said bottom wall and extending toward said access aperture, wherein fertilizer placed in said housing is positioned laterally between said outlet tube and said peripheral wall;
    said inlet tube having a first end positioned within said connecting pipe and a second end fluidly coupled to said housing, said first end being directed toward said primary inlet, said first end being positioned nearer to said primary inlet than said secondary inlet to prevent liquid from said secondary inlet from entering said first end of said inlet tube, said second end being positioned below an upper end of said outlet tube;
    said peripheral wall including transparent portions to allow viewing into said housing;
    a one way valve being mounted in said outlet tube and allowing flow of liquid in only a first direction from said housing to said connecting pipe through said outlet tube;
    a drain valve being mounted on said housing and fluidly coupled to said interior space, said drain valve being opened to drain liquid from said interior space or closed to retain liquid in said interior space;
    a shut off valve being fluidly coupled to said inlet tube to open or close said inlet tube.

* * * * *